United States Patent [19]

Nakamura

[11] Patent Number: 4,514,163
[45] Date of Patent: Apr. 30, 1985

[54] SYNTHETIC RESIN EXTRUDING MEANS

[76] Inventor: Kensaku Nakamura, 272-1, Bessho-cho, Matsubara, Osaka, Japan

[21] Appl. No.: 555,651

[22] Filed: Nov. 28, 1983

[51] Int. Cl.³ .............................. B29F 3/00; B29F 3/02
[52] U.S. Cl. ...................................... 425/204; 366/90; 425/376 R
[58] Field of Search ................... 425/376 R, 203, 204; 366/90

[56] References Cited

U.S. PATENT DOCUMENTS

| | | | |
|---|---|---|---|
| 868,355 | 10/1907 | Mueller | 425/204 |
| 1,158,908 | 11/1915 | Ehrhart | 425/376 R |
| 2,680,879 | 6/1954 | Schnuk et al. | 366/90 |
| 2,829,399 | 4/1958 | Caracciolo et al. | 425/376 R |
| 3,006,029 | 10/1961 | Saxton | 366/90 |
| 3,305,893 | 2/1967 | Machen | 425/376 R |
| 3,347,528 | 10/1967 | List et al. | 425/376 R |
| 3,640,669 | 2/1972 | Hanslik | 425/376 R |
| 3,941,535 | 3/1976 | Street | 366/90 |
| 4,052,038 | 10/1977 | Brand | 366/90 |
| 4,054,403 | 10/1977 | Hornbeck et al. | 425/376 R |

FOREIGN PATENT DOCUMENTS

| | | | |
|---|---|---|---|
| 908366 | 8/1972 | Canada | 366/90 |
| 2938048 | 4/1981 | Fed. Rep. of Germany | 425/376 R |
| 1377457 | 9/1963 | France | 425/376 R |
| 41962 | 4/1979 | Japan | 425/376 R |

Primary Examiner—Willard E. Hoag

[57] ABSTRACT

This invention is concerned with an improved construction of synthetic resin extruding means provided with a single unit having a kneading power which is strong enough to mix or knead a resin strengthening admixture material with a raw resin material and being able also to extrude nothing but resin from the extruding means as in the case with the conventional type extruding means. The invention further involves a construction of extruding means provided with a particular mouth formed on a kneading portion of the means so that the resin strengthening admixture material can be put into the extruding means.

2 Claims, 7 Drawing Figures

SYNTHETIC RESIN EXTRUDING MEANS

BACKGROUND OF THE INVENTION

The present invention is generally related to an improvement of synthetic resin extruding means having an end provided with a mouth for feeding a raw resin material into, and the other end provided with an extruding mouth for extruding a molten quantity of resin material through a cylindrical heater means wherein a screw shaft is rotatably inserted so as to feed the material to the extruding mouth, and more in particular to an improved construction of extruding means having a screw shaft portion provided with a kneading means for a raw material resin material, which means is able not only to carry out a more efficient kneading operation but also to shift the same into the conventional kneading operation.

DESCRIPTION OF THE PRIOR ART

Of late wider use has been made of synthetic resin material for varied purposes, and to meet these it is more often than not that such requirements are made either of sufficient strength of resin itself or for increasing in quantity thereof. Generally in case of extruding a synthetic resin, a single screw shaft is enough to knead a raw resin material. However, when kneading operation is made of resin with an admixture material, two screw shafts are provided on a resin extruding means. The trouble with the conventional type two screw shaft extruding means is, however, that the equipment itself cannot but be made dimensionally enlarged at a higher cost of manufacture. Moreover, operaters must take the trouble of cleaning the inside of the equipment when color of the material needs be changed: During the course of this cleaning, kneading operation of the means must be discontinued which results in the operational effect of the means being decreased. Thus in order to mitigate the above-mentioned disadvantages, use may be made of a single screw shaft formed with a particular shape of kneading portion, according to which, however, only a small kneaded quantity is extruded and the kneading operational effect of resin with an admixture material is insufficient. Furthermore when a single raw resin material is kneaded on the same condition as it is kneaded with an admixture material, a kneaded quantity of resin is qualitatively changed, giving rise to decreasing the value of finished goods.

SUMMARY OF THE INVENTION

Accordingly, the present invention has been devised to eliminate all the above-mentioned drawbacks and disadvantages of the conventional types, and has as one of its main objects provision of a resin extruding means having a chamber wherein satellite kneading shafts are accommodated that form satellite gears intermeshingly rotatable with kneading teeth of screw shaft thereby to secure effective kneading operation: According thereto, it is possible to fully knead a raw resin material with an admixture material.

Another object of the invention is to provide a resin extruding means having a chamber wherein a wall side shaft (i.e. a smooth continuous outer surface as contrasted with a grooved surface having teeth as shown more particularly in FIGS. 6,7) is accommodated thereby to diminish kneading operation of the screw shaft caused by the kneading grooves thereof and provide strong kneading operation, thus making it possible to properly knead a raw resin material which otherwise might be damaged qualitatively: Moreover according to this construction, a high kneading operation and a low kneading operation can be selectively carried out merely by manually selecting and replacing said satellite kneading shaft and said wall side shaft, thus making it possible to easily select a desired kneading operation.

A further object of the invention is to provide a resin extruding means that comprises a chamber having a hole that serves to be a feed mouth and a mouth for putting a first synthetic resin material therethrough, thus making it possible to use said hole as a means for putting a second raw material so that said second raw resin material put through the mouth can be fed directly to a headed kneading portion, thus being softened immediately to result in being kneaded very effectively. Furthermore, inasmuch as the second raw resin material is put into the intermeshingly engaged portion of the kneading portion, the material can be securedly held in good condition, thus being fed steadily without discontinuation.

A still further object of the invention is to provide a resin extruding means wherein the hole that serves as a mouth through which the second raw resin material is to be put is readily opened and closed, whereby when opened, the hole serves as an extruding means in accordance with the property of the second raw resin material but when closed, the hole serves as a single extruder for general use.

As has been mentioned in the foregoing, the synthetic resin extruding means of the present invention has many operational functions, such as that a kneading portion is adjustable of kneading faculty, and a mouth that serves as a means for putting a raw resin material therethrough is freely opened and closed in accordance with kind of raw resin material fed so that by properly combing these operational functions, it is quite possible to extrude resin material in desired conditions. Further according to the invention, the resin extruding means is structurally simple enough to produce at a very low cost of manufacture.

BRIEF DESCRIPTION OF ACCOMPANYING DRAWINGS

DETAILED DESCRIPTION OF THE INVENTION

Figure 1:
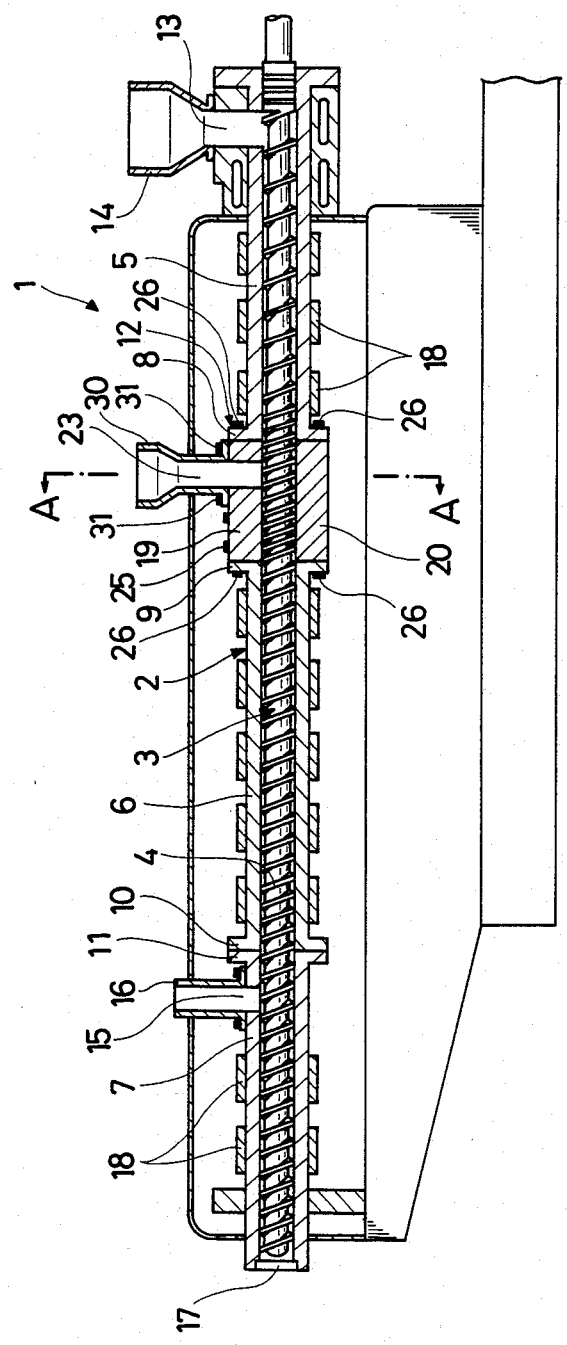
FIG. 1 is a vertical elevation view showing a resin extruding means of the invention wherein a mouth for a second raw material to be fed therethrough is provided on the means.
Figure 2:
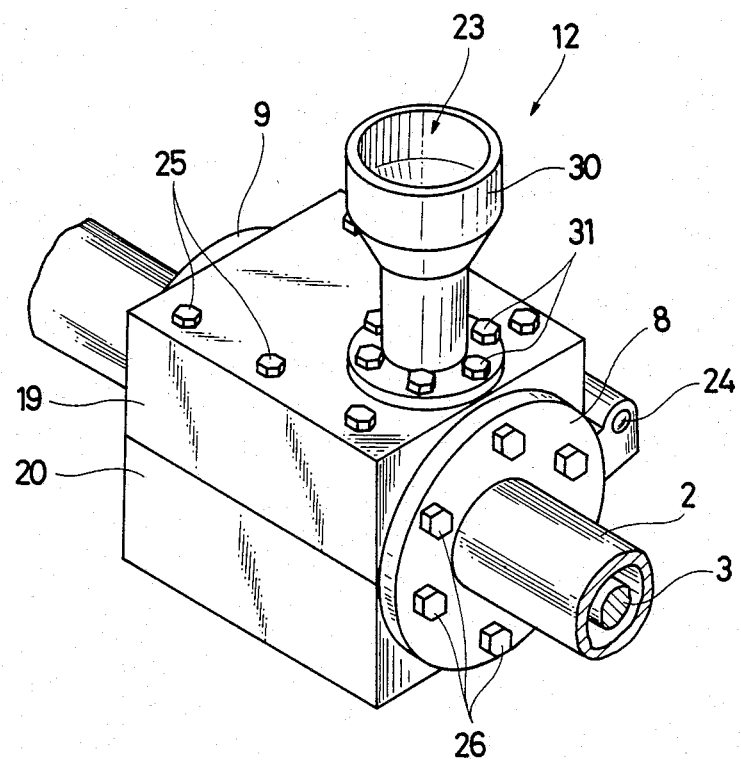
FIG. 2 is a perspective view partially showing an elemental portion of a kneading means.
Figure 3:
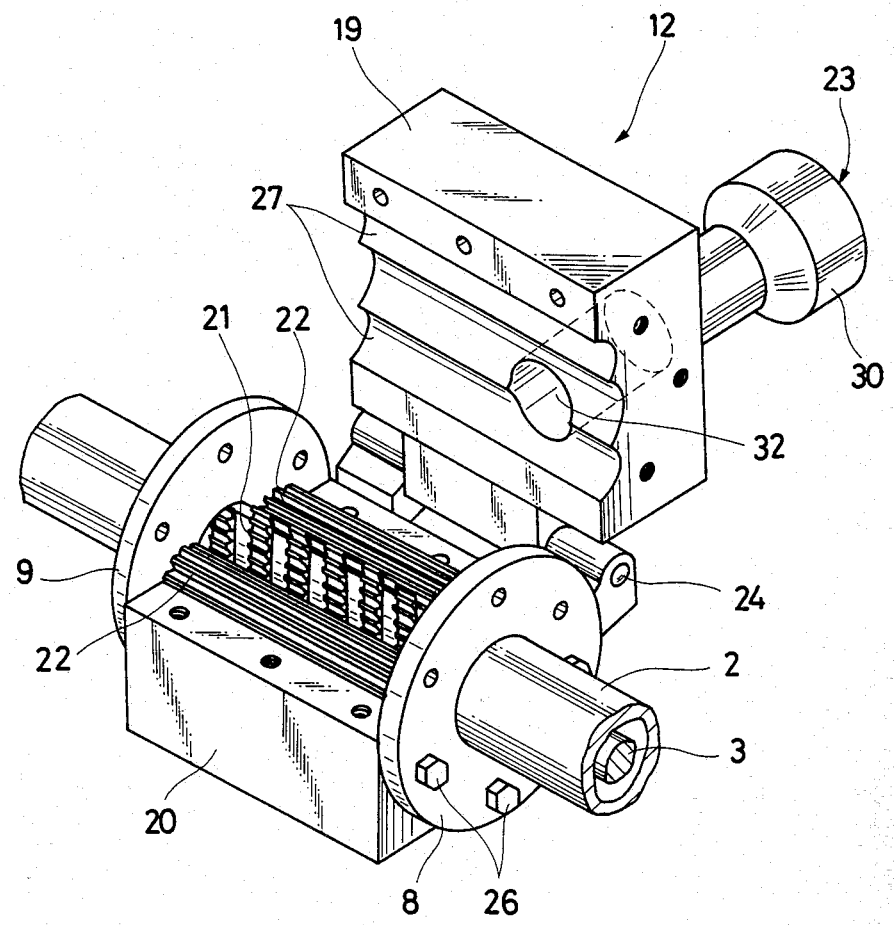
FIG. 3 is a perspective view showing an opened state of the kneading portion of the means.
Figure 4:
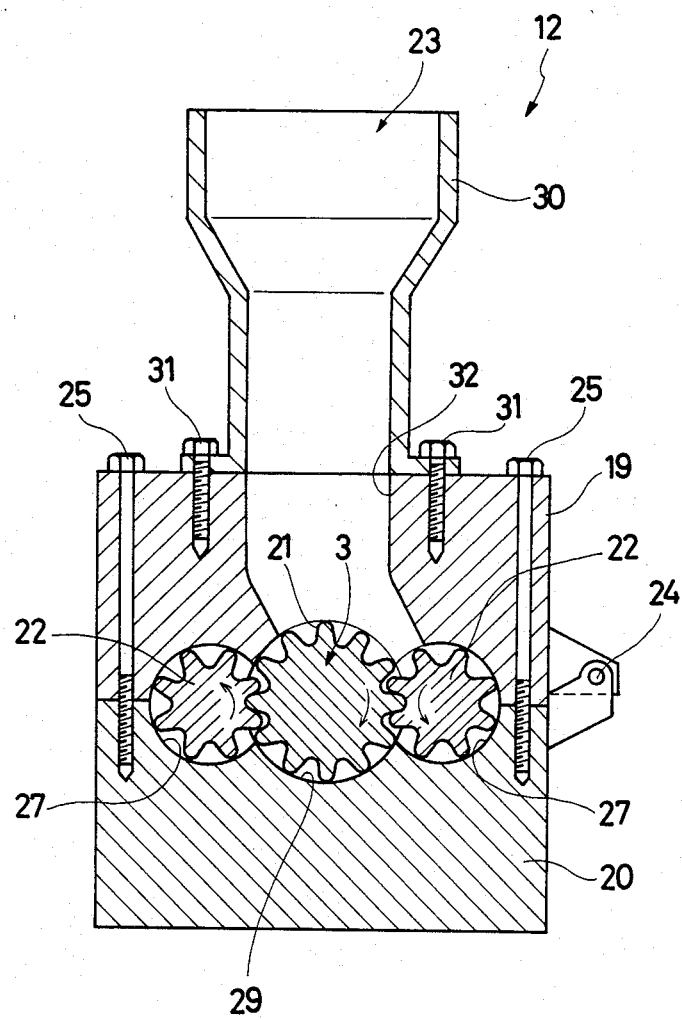
FIG. 4 is a vertical cross-section view showing a kneading means taken along the line A—A of FIG. 1.
Figure 5:
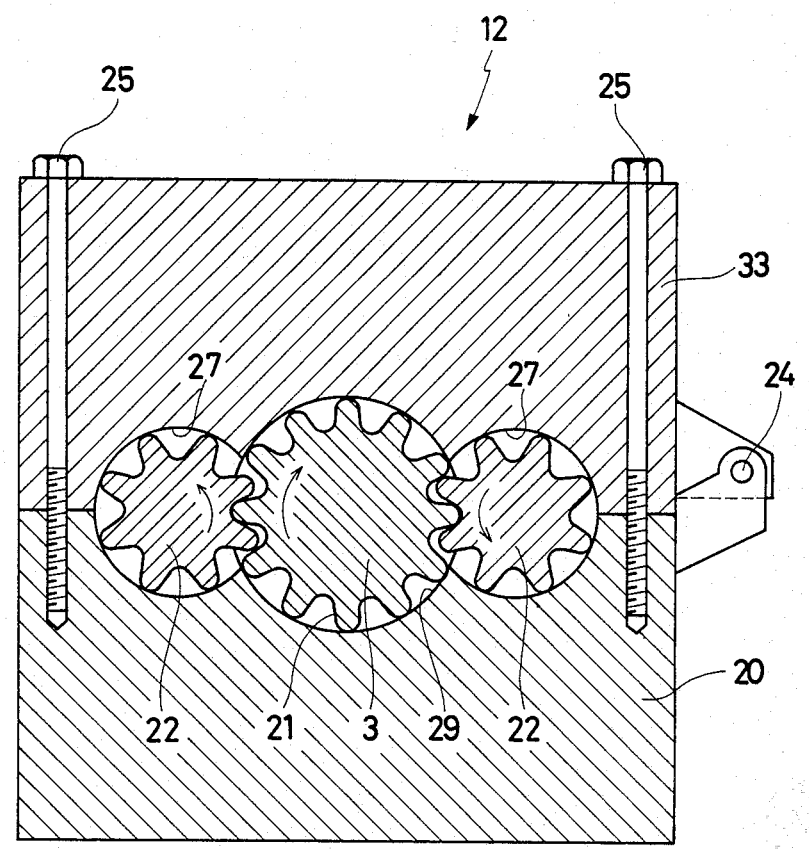
FIG. 5 is a vertical cross-section view showing the state of the kneading means wherein there is provided no mouth for a second raw material.
Figure 6:
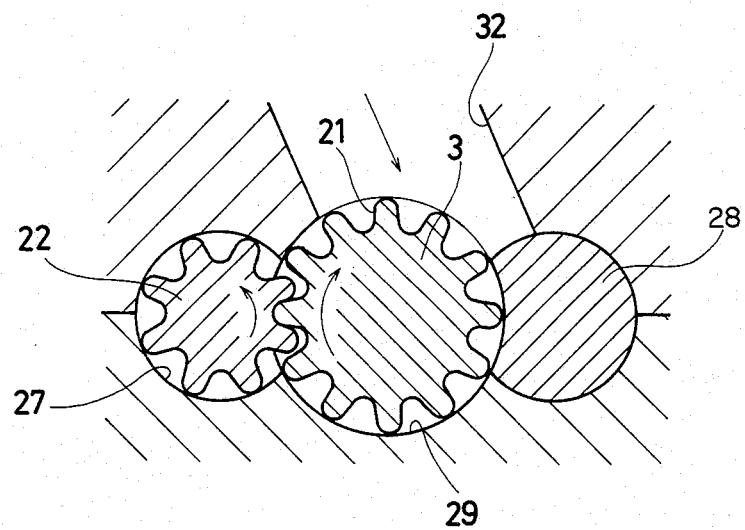
FIG. 6 is a diagram illustrating the function of the medium kneading state.
Figure 7:
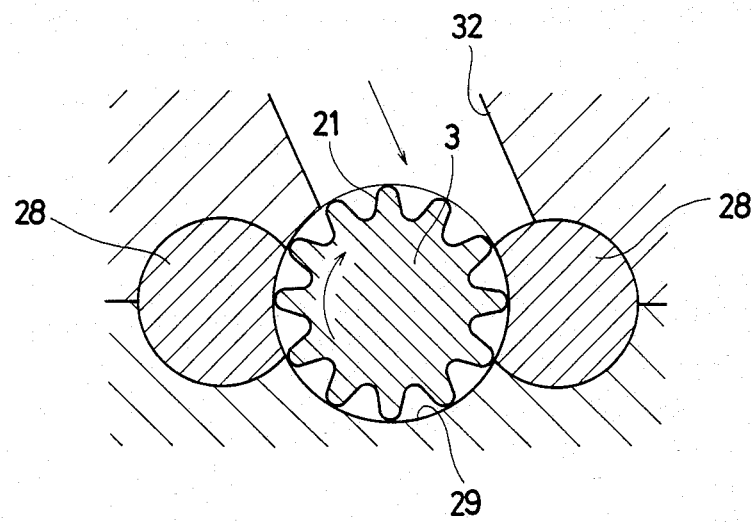
FIG. 7 is likewise a diagram illustrating the function of the low kneading state.

Now set forth in detail are a few preferred embodiments of the invention in conjunction with the drawings. In FIG. 1, numeral 1 generally designates a main body of extruding means that comprises a cylindrical heater 2 and a screw shaft 3 inserted into heater 2. The screw shaft 3 has its outer periphery grooved with convoluted groove 4, with its one end (not shown in the drawings) connected to a driving source which can rotate screw shaft 3 in a selected direction. The cylindrical heater 2 comprises a first cylinder 5, a second cylinder 6 and, a third cylinder 7 interconnected with each other by rigidly fixing flanges 8 thru 11 formed between each end of said cylinders 5 to 7 and bolts (not shown). Incidentally, between flanges 8 and 9 there is mounted a kneading means 12 which will be referred to hereinafter, through which cylinders 5 and 6 are connected with one another. On the extremity of first cylinder 5 there is formed a first mouth 13 for feeding a main raw resin material. On mouth 13 is mounted a hopper 14. On the extremity of third cylinder 7 there is formed a vent 15 upon which there is mounted a vent cylinder 16 provided to vent a quantity of air contained in the raw material being molten. At a free end of third cylinder 7 there is an extruding mouth 17 for extruding a quantity of molten raw material and provided with a mold having a nozzle (not shown) On the outer peripheral surface of cylinders 5 to 7 there are mounted band type heater 18 for heating these cylinders 5 to 7. The kneading means 12 is situated in a position corresponding to a vent of the extremity of screw shaft 3, and comprises an upper movable block 19, a lower fixed block 20, and a pair of satellite kneading shafts 22, 22 intermeshingly engageable with teeth 21 as are definitely shown in FIGS. 2 to 4 of the accompanying drawings. These upper and lower blocks 19 and 20, are dividable into two hollow portions to form divided surfaces that corresponds axially to the screw shaft 3. On the upper movable block 19 there is mounted a mouth 23 to be described later on that serves as a first mouth for putting a second raw material therethrough. The upper movable block 19 is mounted in detouchable relation with respect to the lower fixed block 20, being pivotally supported by means of a hinge 24 formed at one side of the block 19 so that the latter block 19 is able to freely open and close in a manner that when closed, it is rigidly fixed on the lower fixed block 20 in integral relation. The lower fixed block 20 is situated in a lower position of the upper movable block 19, being connected by means of bolts 26 to the flanges 8 and 9 which are between cylinders 5 and 6. The divided surfaces of both the blocks 19 and 20 situated at both sides of screw shaft 3 are formed in cylindrical chambers 27, 27 so that have their axes parallel with screw shaft 3, having an inner wall portion overlapped with the shaft 3, chambers 27, 27 being disposed of receiving shafts which will be referred to hereinafter. Along kneading screw shaft 3 there are grooved two raws of grooves 4 on the outer peripheral surface thereof. On the walls forming the grooves there are formed kneading teeth 21 grooved into flat teeth shape. In the inside of chambers 27, 27 there is alternatively accommodated by manual replacement one of two kinds of shafts subject to the properties of raw resin material selected. For a fuller understanding, in a certain case both satellite kneading shafts 22, 22 are used as shown in FIGS. 4 and 5, and in other case both one of the satellite kneading shafts 22 and one of the wall side shafts 28 may be used as shown in FIG. 6, and in a still further case both the wall side shafts 28, 28 may be used as shown in FIG. 7. As depicted in FIGS. 6,7, the wall side shafts are elongated cylindrical with continuous outer surfaces with an arc shaped channel or opening extending along the wall axially with a diameter similar to that of shaft 3. The satellite kneading shaft 22 has its outer periphery in contact with the inner wall surface of the chamber 27, the outer periphery being grooved with flat teeth engageable with the kneading teeth 21 of the screw shaft 3. The wall side shaft 28 is held in contact with the inner wall surface of chamber 27 thereby to keep the chamber 27 in closed relation while a portion of the inner wall surface opposite to the screw shaft 3 is formed into an arc shape wall surface 29 which permits the screw shaft 3 to rotate. The abovementioned two kinds of shafts may be selectively used subject to the kneading condition in which raw resin material is required. The second mouth 23 for putting raw resin material therethrough has a hopper shape cylinder 30 mounted intermediate of an upper extremity of a bolt 31. The cylinder 30 and the inner portion of chamber 27 are intercommunicated with one another through an inner hole 32 which is disposed at an angle so as to guide raw resin material between the satellite kneading shaft 22 and the screw shaft 3 that rotates in the direction where the shaft 3 induces raw resin material internally. Furthermore, mouth 23 is adapted to be used selectively in either freely opened or closed condition subject to the kind of raw resin material; that is, when used in opened state, mouth 23 can be used as a vent or venting hole but when use in closed state, the upper movable block 19 is removed and replaced with an upper movable block 33 which is not bored with any mouth as is shown in FIG. 5. Incidentally, closing operation of mouth 33 can be carried out also by forming mouth to block up the inner hole 32 with a suitable plug means after removing the cylinder 30. The synthetic resin extruding means constructed in the above-mentioned manner is such that desired shafts can be accommodated in the inside of the chambers 27, 27 of the kneading means 12 and that mouth 23 may be used selectively subject to the kind of raw resin material to be molded. The foregoing accommodating operation can be carried out by firstly removing the bolts 25, 26 to release the upper movable block 19, and accommodating desired shafts into the chambers 27, 27 of the lower fixed block 20, thereafter blocking up the upper movable block 19 again and rigidly fixing these two blocks 19 and 20 by means of the bolts 25, 26 . . . ; Further opening and closing operations of the mouth 23 can be carried out when either of the upper movable block 19 provided the mouth 23 (with respect to FIG. 4) or the upper movable block 33 which is not provided with the mouth 23 (with respect to FIG. 5) is mounted on the lower fixed block 20 by mounting or dismounting the bolts 25, 26 . . . and the hinge 24. In case of operating the synthetic resin extruding means of the invention, an operater may electrify the band heater 18 to heat the cylindrical heater 2 to a fixed degree of temperature and then drive the screw shaft 3 into rotation at a fixed rate, thereafter feeding raw resin material into the hopper 14 whereby the material is put into the first mouth 13, fed into the cylindrical heater 2 by means of the screw shaft 3, being molten in sequence. If in this case, the kneading means 1 is working in kneading condition, a molten quantity is continuously transferred while being kneaded. If then the second raw material having varieties of properties such as calcium carbonate or glass fibre is fed into the second mouth 23 subject to molding conditions during the course of this extruding operation, the second raw material is fed directly to the intermeshingly engaged portion of the heated kneading means, a quantity of raw resin material will be mixed or kneaded with the second raw material and a mixed or kneaded quantity will be transferred to the extruding mouth 17. In this connection, when the kneading means 12 is applied to knead the raw resin material with a second raw material as in the above-mentioned manner, the following three kinds of kneading states or conditions will be brought out; namely, a high kneading condition produced by using a pair of satellite kneading shafts 22, 22 as shown in FIGS. 3 to 5 a medium kneading condition produced by using a single satellite kneading shaft 22 and a single wall side shaft 28 as shown in FIG. 6, and a low kneading condition produced by using a pair of wall side shafts 28, 28. With respect to the high kneading condition, a quantity of raw resin material fed to a kneading position is kneaded by intermeshingly engaged relation between the kneading teeth 21 of the screw shaft 3 and each of the satellite kneading shafts 22, 22. In other words, a quantity of raw resin material filled in each teeth space defined between the teeth is forced out by the intermeshing engagement of the teeth and repetition of filling and forcing out the material causes a high degree of kneading condition. With respect to the medium kneading condition, as shown in FIG. 6 kneading operation is carried out between a single satellite kneading shaft 22 and a kneading teeth 21 of the screw shaft 3. This kneading operation is reduced by half, compared with the preceding case, thus producing a medium degree of kneading condition. In this case, the wall side 29 of the wall side shaft 28 is made equal in level to an extended wall of the cylindrical heater 2 so that no kneading operation is caused. Further in this case, wall side 29 is always forced to face a plurality of kneading teeth 21, thus preventing the wall side shaft 28 from rotating. With respect to low kneading condition, the wall sides 29, 29 of said two wall sides shafts 28, 28 are an extended wall of the cylindrical heater 2, thus kneading operation attributive to the kneading teeth 21 of the screw shaft 3 is reduced. The above-mentioned three kneading operations are selectively employable subject to the properties of raw resin material to be used, In the preceding embodiment of the invention, reference has been made of the kneading teeth 21 and the satellite kneading shaft 22 which are both flat teeth. However, any other suitable shape teeth may be employed, and the wall side 29 of the wall side shaft 28 may be grooved so as to carry out a weak or low degree of kneading operation between the wall side 29 and the screw shaft 23. It should be noted that the present invention, illustrated and described in detail in the drawings and foregoing description, is to be considered as illustrative and restrictive in character, and that all changes and modifications that come within the spirit of the present invention are included.

What is claimed is:

1. In a synthetic resin extruding apparatus, the improvement comprising:
   an elongated cylindrical screw shaft comprising a screw shaped grooved surface on the outer periphery thereof;
   a cylindrical heater coaxially surrounding said screw shaft;
   a feed mouth disposed at one end of said screw shaft for feeding a first raw material for kneading by said screw shaft; and
   an exit mouth disposed at another end of said screw shaft for exiting of said material after kneading by said screw shaft;
   said screw shaft comprising at least two segments, a first segment having said grooves, and a second segment having said grooves with teeth on walls forming said grooves;
   a lower block disposed about substantially a lower part of said second segment;
   an upper block movably connected to said lower block so that in a closed position said upper and lower blocks surround said second segment of said screw shaft, and having an open position in which said upper and lower blocks are partially disconnected from each other to permit access thereto and thereby to enable manual replacement of auxiliary kneading shafts;
   said upper and lower blocks each comprising a corresponding first elongated cylindrical hollow portion for fitting about said screw shaft, a corresponding second elongated cylindrical hollow portion of a smaller diameter than said first hollow portion and disposed parallel to said first hollow portion, for holding a manually replaceable auxiliary kneading shaft, and a corresponding third elongated cylindrical hollow portion of a smaller diameter than said first hollow portion and disposed parallel to said first hollow portion, for holding a manually replaceable auxiliary kneading shaft, and feed means having access to said first hollow portion for feeding a second raw material for working by said screw shaft operable in conjunction with said first and second auxiliary shafts; said first and second replaceable auxiliary kneading shafts having screw shaped groove surfaces on the periphery thereof with teeth on the walls defining the grooves, said teeth being engagable with said teeth on said screw shaft.

2. In a synthetic resin extruding apparatus, the improvement comprising:
   an elongated cylindrical screw shaft comprising a screw shaped grooved surface on the outer periphery thereof;
   a cylindrical heater coaxially surrounding said screw shaft;
   a feed mouth disposed at one end of said screw shaft for feeding a first raw material for kneading by said screw shaft; and
   an exit mouth disposed at another end of said screw shaft for exiting of said material after kneading by said screw shaft;
   said screw shaft comprising at least two segments, a first segment having said grooves, and a second segment having said grooves with teeth on walls forming said grooves;
   a lower block disposed about substantially a lower part of said second segment;
   an upper block movably connected to said lower block so that in a closed position said upper and lower blocks surround said second segment of said screw shaft, and having an open position in which said upper and lower blocks are partially disconnected from each other to permit access thereto and thereby to enable manual replacement of auxiliary kneading shafts;
   said upper and lower blocks each comprising a corresponding first elongated cylindrical hollow portion for fitting about said screw shaft, a corresponding second elongated cylindrical hollow portion of a smaller diameter than said first hollow portion and disposed parallel to said first hollow portion, for holding a manually replaceable auxiliary kneading shaft, and a corresponding third elongated cylindrical hollow portion of a smaller diameter than said first hollow portion and disposed parallel to said first hollow portion, for holding a manually replaceable auxiliary kneading shaft, and feed means having access to said first hollow portion for feeding a second raw material for working by said screw shaft operable in conjunction with said first and second auxiliary shafts; said first and second replaceable auxiliary shafts having substantially the same diameter as said second or third hollow portion with an arc shaped channel part extending axially along the surface thereof and shaped to coincide with said first hollow portion.

* * * * *